J. J. HOVER.
WIND SHIELD FOR AUTOMOBILES.
APPLICATION FILED JAN. 29, 1917.

1,269,447.

Patented June 11, 1918.
2 SHEETS—SHEET 1.

Inventor
J. J. Hover
By A. J. O'Brien
Attorney

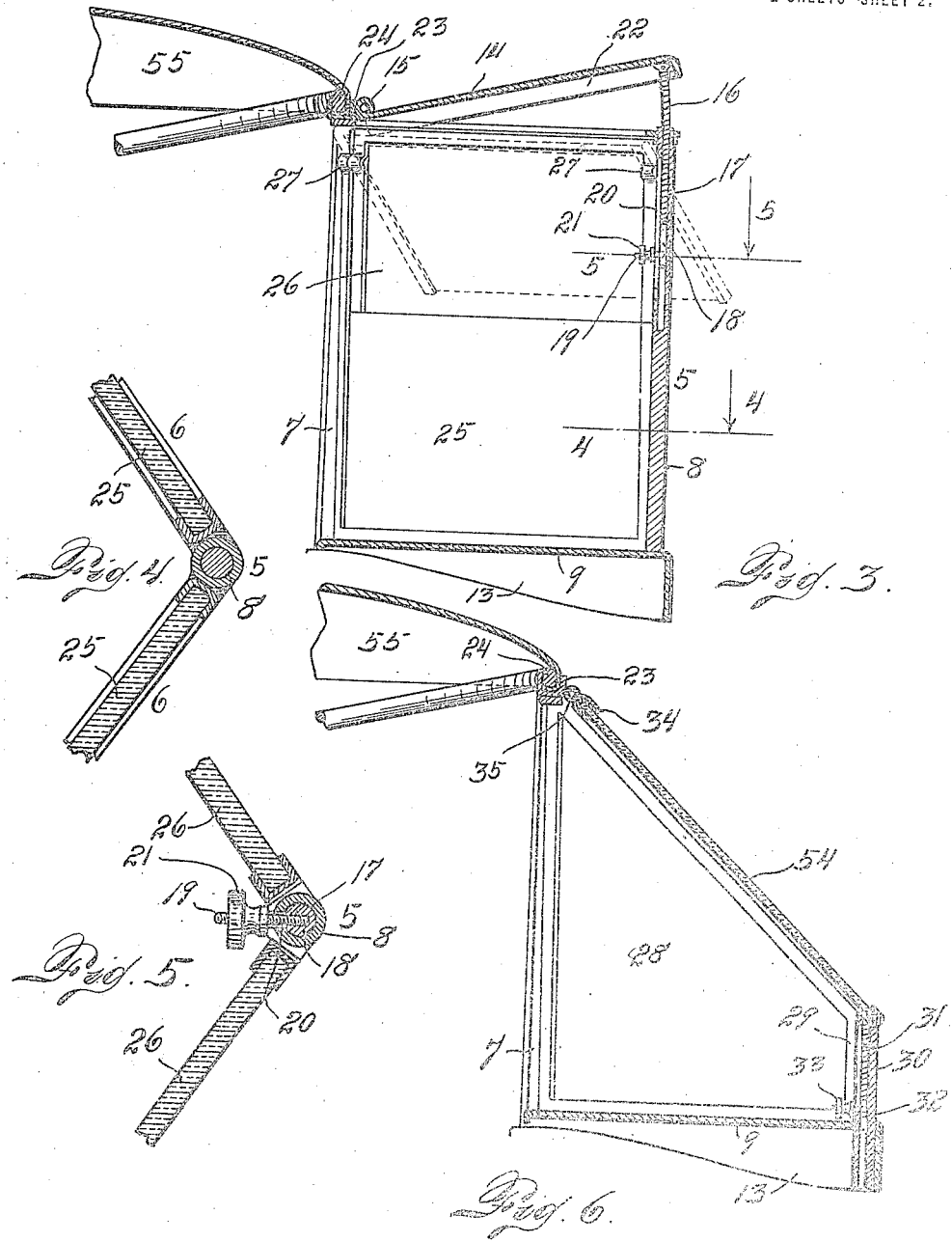

UNITED STATES PATENT OFFICE.

JOHN J. HOVER, OF DENVER, COLORADO.

WIND-SHIELD FOR AUTOMOBILES.

1,269,447.  Specification of Letters Patent.  Patented June 11, 1918.

Application filed January 29, 1917. Serial No. 145,068.

*To all whom it may concern:*

Be it known that I, JOHN J. HOVER, a citizen of the United States, residing at the city and county of Denver and State of Colorado, have invented certain new and useful Improvements in Wind-Shields for Automobiles; and I do declare the following to be a full, clear, and exact description of the invention, such as will enable others skilled in the art to which it appertains to make and use the same, reference being had to the accompanying drawings, and to the characters of reference marked thereon, which form a part of this specification.

My invention relates to improvements in wind shields, more particularly intended for use on automobiles or motor vehicles, my object being to provide a construction of this class which shall offer less resistance during the travel of the machine, than the wind shields heretofore employed, which so far as I am aware have presented a flat surface to the wind, said surface extending transversely or at right angles to the direction of travel. It is well known that in machines employed for racing where the maximum limit of speed is desired, wind shields are discarded completely. This, of course, is because of the great resistance which the ordinary wind shield offers to the travel of the machine by reason of the relatively large area which engages the atmosphere, the wind shield being in the position heretofore explained.

In my improvement, I employ a construction having sides which converge as they extend forwardly, their forward edges meeting in an apex whose angle may vary according to the circumstances. In some makes of machines the forwardly protruding apex may be relatively sharp, while in other cases, the degree of sharpness will be reduced, but in any event the sides of the wind shield will be inclined to the direction of travel, whereby the apex of the same is presented to the wind and cuts the atmosphere in such a way as to materially reduce the resistance to the travel of the machine, thereby cutting down the expense of gasolene, since a less quantity will be required for a given mileage.

In my improvement, the space in the rear of the wind shield and extending forward from the tonneau or body of the machine, is closed at both the top and bottom. At the bottom, this space or chamber may be closed by the portion of the machine which is located between the tonneau and the engine housing or hood, or a special closure may be provided. At the top, however, a triangular plate is employed which if the sides of the wind shield are rectangular whereby their upper edges occupy horizontal positions, may consist of a metallic plate or it may be composed of glass or other suitable transparent material if desired. In any event it is hinged in such a manner that it may be lifted from its forward end for ventilating or other purposes. Or the top of the wind shield may extend downwardly as it extends forwardly, thus forming an inclined closure for the wind shield chamber. In this event this top plate must be of glass or other suitable transparent material so that the chauffeur or person in charge of the machine may look through it while the machine is in use. This top plate is also hinged at its rear and upper extremity, whereby it may be raised and lowered at will as circumstances may require. Where the top plate normally occupies a horizontal position and the sides of the wind shield are rectangular, these sides may be divided and their upper members hinged to open in a manner similar to the ordinary construction of wind shields. However, where the top plate is inclined downwardly from the top of the machine, it is preferred that the side members of the wind shield shall be integral and stationary, since the hinging of the top plate will obviate the necessity of dividing the side plates and hinging the upper members thereof.

Having briefly outlined my improvement, I will proceed to describe the same in detail, reference being made to the accompanying drawing in which is illustrated an embodiment thereof. In this drawing:—

Fig. 3 is a vertical section taken on the line 3—3 Fig. 2.

Figure 1:
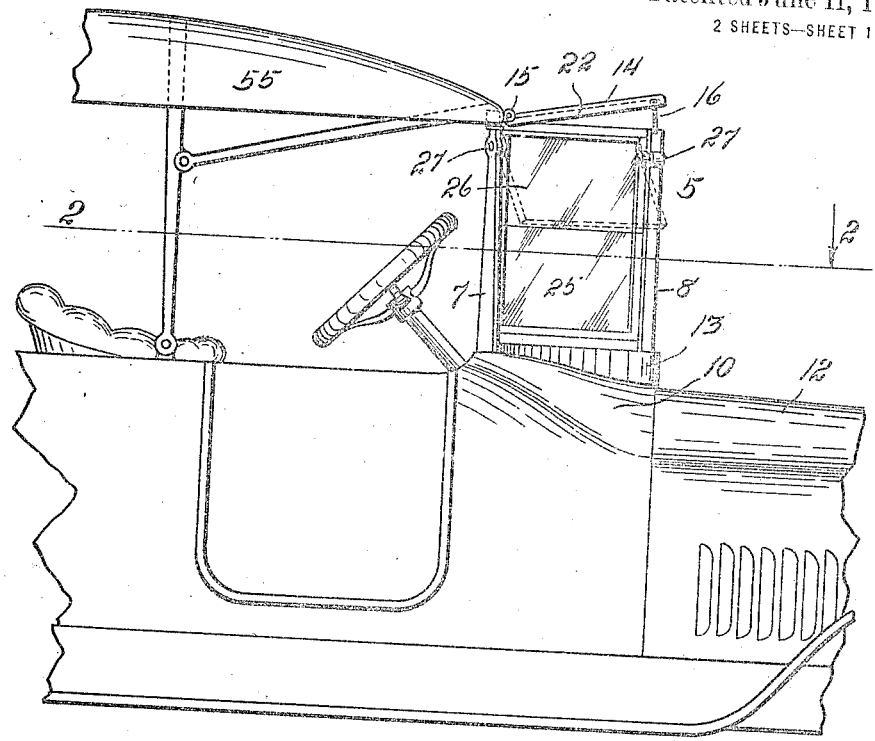
Figure 1 is a fragmentary side elevation of the body of an automobile, equipped with my improved construction of wind shield.
Figure 2:
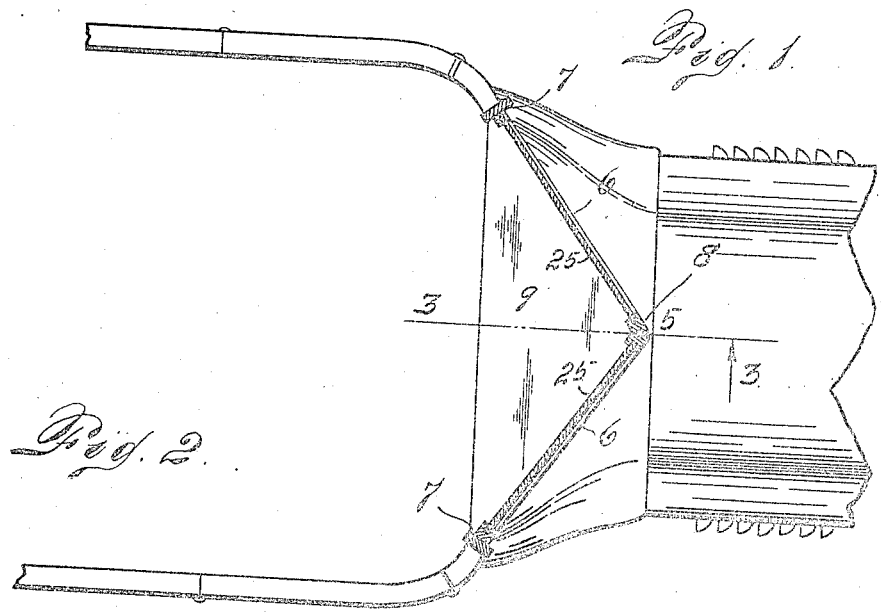
Fig. 2 is a horizontal section taken on the line 2—2 of Fig. 1 looking downwardly or in the direction of the arrow.

Figs. 4 and 5 are sections taken on the lines 4—4 and 5—5 respectively of Fig. 3.

Fig. 6 is a section illustrating a modified form of construction.

Referring first more particularly to Figs.

1 to 5 inclusive, let the numeral 5 designate a wind shield which is composed of two converging sides 6 which meet in an apex at the forward extremity of the shield, the plates 6 converging or approaching each other as they extend forwardly. The rear edges of these plates 6 engage upright frame bars 7, while their forward extremities engage a common bar 8 which is also upright, its lower extremity resting on the bottom plate 9 of the wind shield. As shown in the drawing the forward extremity 10 of the body of the machine which slopes downwardly to the hood 12, is built up as shown at 13 in order that the bottom plate 9 of the wind shield may occupy a horizontal position. The space within the wind shield and forward of the tonneau, is normally closed at the top by a plate 14 which is attached at its rear extremity as shown at 15. This plate is triangular in shape and corresponds so far as its forwardly located point is concerned, to the angle of the side 6 of the wind shield. This forward extremity or apex of the plate 4 is equipped with a downwardly extending flexible rod 16 which enters a vertically disposed opening 17 formed in the bar 8. The lower extremity of this flexible member is composed of a rigid metal part 18 which, however, is relatively short and forms a support for a set screw 19 which is threaded thereinto and passes through a slot 20 formed in the rear portion of the bar 8 and communicating with the opening in which the parts 16 and 17 move. This set screw is equipped with a nut 21 which is threaded on the forward extremity of the screw and when tightened on the latter, will support the top plate 14 in the open position, since the forward extremity of the nut constitutes a shoulder which engages the bar 8 on opposite sides of the slot through which the screw proper passes. Hence when the chauffeur wishes to open the plate 14, he simply loosens the nut 21 and lifts the said plate by exerting a lifting stress on the nut and set screw. After the top plate has been raised to the desired height, the nut 21 is again tightened, whereby the said plate is supported in the raised or open position. The side edges of the plate 14 are provided with depending flanges 22, which overlap the side plates 6 of the wind shield at the top in order to form tight joints. The rear top bar 23 of the wind shield is grooved or channeled to receive the transversely arranged forwardly located bar 24 of the top 55 of the machine. By virtue of this construction a relatively tight joint is formed between the top of the automobile and the wind shield, thus making it practicable to tightly close the structure where the top joins the wind shield.

As illustrated in the drawing, each of the side plates 6 is composed of a lower stationary member 25 and an upper member 26 which is hinged as shown at 27, whereby the latter may be opened by tilting it to a suitable angle as indicated by dotted lines in Figs. 1 and 3. As shown, the adjacent edges of the two members 25 and 26 are plain or uninclosed, thus preventing any obstruction of the view where the two members join each other when the sides of the wind shield are closed.

In the form of construction shown in Fig. 6, the opposite sides 28 of the wind shield are stationary and their upper edges slope downwardly as they extend forwardly. These sides also approach each other as they extend forwardly, thus providing a construction which offers relatively little resistance to the progress of the machine by reason of its contact with the air, the same as in the other form of construction. The forward vertical edges 29 of the side plates are relatively short, but engage a stationary upright bar 30 which is open to receive a flexible member 31 with whose lower extremity a set screw 32 is connected, this screw being equipped with a nut 33 for the purpose of tightening the triangular top plate 54 when the latter has been properly adjusted. It will be understood from an inspection of the drawing that the top plate 54 is composed of glass or other suitable transparent material, its rear edge entering a bar 34 and being hinged as shown at 35 for opening purposes. In this form of construction, both the sides and the top of the wind shield present inclined surfaces to the atmosphere as the machine moves forwardly, whereby the resistance offered is largely overcome.

From the foregoing description, the use and operation in my improved wind shield construction will be readily understood. In the form of construction shown at Figs. 1 to 5 inclusive, the driver or person in charge of the machine will look through the converging side wall 6 whose upper members 26 may be opened or closed as may be desired, while in the form of construction shown in Fig. 6, the chauffeur will look through the transparent top plate 54 or underneath the latter when it is opened for the purpose.

Having thus described my invention, what I claim is:

1. A wind shield whose sides approach each other as they extend forwardly, and an upright stationary bar in which the forward extremities of both such plates are anchored.

2. A wind shield whose sides approach each other as they extend forwardly, and means for closing the wind shield at the top and bottom, the top closure consisting of a plate hinged to permit raising and lowering as may be required.

3. A wind shield whose sides approach each other as they extend forwardly, and means for closing the wind shield at the top and bottom, the top closure consisting of a triangular plate hinged to permit adjustment.

4. A wind shield whose sides approach each other as they extend forwardly and means for closing the wind shield at the top and bottom, the top closure consisting of a hinged triangular plate, and means for securing the plate in the desired position of adjustment.

5. A wind shield whose sides approach each other as they extend forwardly, and means for closing the wind shield at the top and bottom, the top closure consisting of a downwardly inclined plate hinged to permit adjustment.

6. A wind shield whose sides approach each other as they extend forwardly, and means for closing the wind shield at the top and bottom, the top closure consisting of a downwardly inclined transparent plate.

7. A wind shield whose sides approach each other as they extend forwardly, and means for closing the wind shield at the top and bottom, the top closure consisting of a downwardly inclined transparent plate hinged for purposes of adjustment.

8. A wind shield whose sides converge as they extend forwardly to form an apex and upright frame bars which engage the vertical edges of the plates and support the latter in place, the said frame work also having a top transversely arranged bar channeled to receive the forward transverse bar at the top of the machine.

9. A wind shield having forwardly extending side members, means for closing the shield at the top, said top closure comprising a plate hinged at one edge.

10. A wind shield having side members which approach each other as they extend forwardly, a closure for the top of the shield, said closure comprising a plate hinged at one edge.

In testimony whereof I affix my signature, in presence of two witnesses.

JOHN J. HOVER.

Witnesses:
 MARY HIGGINS,
 ALBERT O'BRIEN.